Sept. 21, 1954 A. PETERS 2,689,626
DEVICE COMPRISING BODIES MOVING RELATIVELY TO EACH OTHER
Filed Sept. 6, 1950
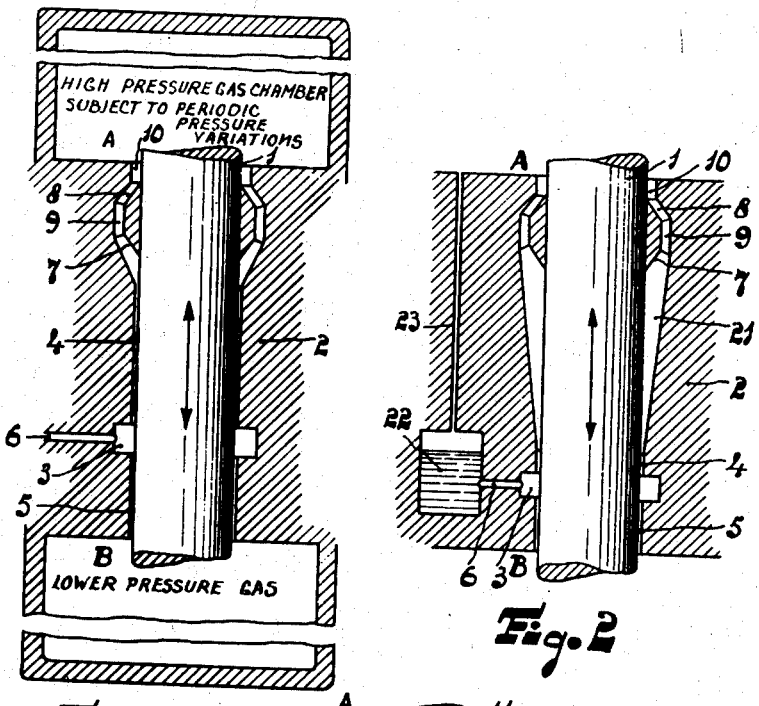
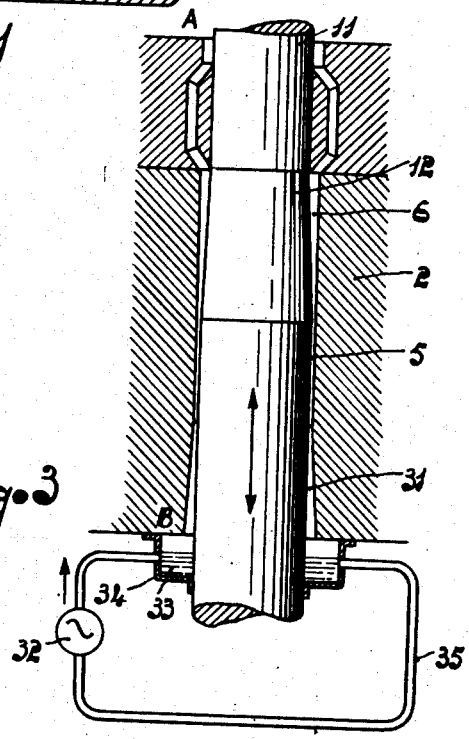
INVENTOR
ALFONS PETERS
BY
AGENT Patented Sept. 21, 1954

2,689,626

UNITED STATES PATENT OFFICE 2,689,626

DEVICE COMPRISING BODIES MOVING RELATIVELY TO EACH OTHER

Alfons Peters, Eindhoven, Netherlands, assignor to Hartford National Bank and Trust Company, Hartford, Conn., as trustee Application September 6, 1950, Serial No. 183,378

Claims priority, application Netherlands September 16, 1949

8 Claims. (Cl. 184—24)

This invention relates generally to a device comprising two bodies reciprocating relatively to each other, one of which has at least a cylindrical part thereof which fits in a bore of the other. More particularly, the invention relates to such devices wherein the body containing the bore functions to separate one gas area or chamber from another having the gas therein at a higher pressure than that obtaining in the first. Such a device may be, for example, one used for the guiding of a piston rod through a stuffing box in a cylinder cover. These devices are usually constructed so that, even though there is the aforesaid pressure difference between the gas at one end and the gas at the other end of the bore, no gas may escape from the higher pressure chamber or area through said bore between the contacting surfaces of said two bodies reciprocating relatively to each other and to said lower pressure chamber or area.

Such guiding means are required to be lubricated so that the said bore will continually contain lubricant to minimize friction between the bore surfaces and that of the reciprocating rod. It has been found in practice that small quantities of lubricant are very often conveyed towards the end of the bore where the gas pressure is higher. This occurs by adherence of the lubricant to the surface of the reciprocating rod despite such higher pressures. In certain cases, for example in internal combustion engines, this transportation of lubricant towards the high pressure area will not involve serious trouble, apart from the loss of lubricant. In other cases, for example in external combustion engines, refrigerating machines operating according to the reversed hot-air engine principle, air compressors and the like, it is highly preferable that such a transportation of lubricant be avoided. This is so since it is important that the interior of the engine, i. e. the working chamber and parts therein, not be subject to contamination which seriously interferes with the operation and efficiency of such external combustion engines, refrigerating machines and compressors.

The present invention has for its object to provide means for avoiding, in the device referred to hereinbefore, not only gas leakage from the space of higher pressure through the bore or piston rod guide means to the space of lower pressure, but also transportation of lubricant through said bore to the space containing the gas or higher pressure, while at the same time maintaining the length of the device concerned within reasonable limits.

The device according to the invention is characterized in that excess lubricant is removed by a member forming part of one of the bodies, which member performs a scraping action upon the surface of the other body. Additionally, a space, which is bounded by that part of the body to be scraped, is located anteriorly of the scraping member with relation to that end of the bore adjacent the chamber or area wherein the gas has a higher pressure. This space communicates with a channel system opening posteriorly of the scraping member on the surface of the body to be scraped. Between said opening and that end of the bore adjacent the chamber or area wherein the gas pressure is lower, lubricant is supplied to said bore at such a pressure that, due to the flow resistance in that portion of the bore between the end of the bore adjacent the higher gas pressure area and the supply area of the lubricant, this lubricant can flow only to that end of the bore where the gas pressure is lower.

The resistance experienced by the lubricant in the said bore portion varies with the nature thereof, i. e., the viscosity; and also with the form of the bore. This bore may, for example, form a labyrinth. The resistance furthermore varies with the gas pressures at both ends of the bore. Moreover, the relative movement of the adjacent surfaces of the two bodies may cause additional resistance.

Thus, for example, one embodiment of the device according to the invention has the feature that the bore portion between the scraping member and the supply area of the lubricant is at least in part shaped conically. This conical bore is so proportioned that the lubricant in the conical bore is forced back to the supply area during the relative reciprocating movement of the two bodies. The result is that the slot consistently contains a quantity of lubricant which avoids or at least reduces leakage of the gas of higher pressure to the space containing the gas of lower pressure.

In order to provide for a sufficient quantity of lubricant in the bore, it is advantageous that, according to a further embodiment of the invention, the lubricant is supplied to the bore through an annular channel.

The lubricant may be supplied under pressure to the cylindrical bore in many different ways. Thus, for example, the liquid may be supplied under pressure by means of a pump.

It is of importance that, according to one embodiment of the invention, the lubricant should be supplied at a pressure exceeding the pressure which would occur at the supply area of the lubricant if gas from the area of higher pressure should escape to the area of the lower gas chamber.

The supply of lubricant leaking away to the area of lower gas pressure may again be supplied by a pumping system to the cylindrical bore to perform a new lubrication cycle.

In certain cases the pressure required for introducing the supply of lubricant into the bore may be produced in different ways. For example, in a further embodiment of the invention where the gas of higher pressure is subjected to periodical pressure variations, liquid lubricant may be supplied to the slot from a container. If the lubricant is supplied from a container under pressure, it is advisable that the space over the liquid surface in this container should communicate through a conduit offering a comparatively high resistance with the space containing the gas of higher pressure. This conduit of comparatively high resistance may be obtained, for example, by providing it with a throttle plate. Alternatively, a capillary conduit may be used.

According to a further embodiment of the invention, a suitable pressure of the lubricant is obtained, if at that end of the bore where the gas pressure is lower, at least one of the surfaces moving along each other is conical and the greatest section of this conical bore is directed to the area of lower gas pressure, the conical bore being proportioned so that the lubricant supplied to this conical bore is pumped towards the area of higher gas pressure during the reciprocal movements of the said body with respect to the cylinder. This embodiment thus does not require an additional auxiliary pump to supply the lubricant under pressure. Under the action of the aforesaid conical bore and of the pressure of the gas in the lower pressure area, the lubricant flows into the cylindrical bore. A state of equilibrium is established due to the resistance of the bore portion between the supply area of the lubricant and the scraping member, and the pressure of the gas in the higher pressure area. Accordingly, the cylindrical bore portion is filled with lubricant.

In order to ensure the supply of lubricant to the aforesaid conical bore, the latter being preferably filled with lubricant during the pumping operation, it is advantageous, in a further embodiment of the invention, to provide the conical bore with the largest section thereof directed towards the area of the gas of lower pressure and with a container connected into said largest section and to which lubricant is supplied. This may be effected with the use of a pump. In certain cases, however, the lubricant may be introduced into the container by splashing, for example, if the container is housed in the crankcase of a prime mover or of a refrigerating machine.

The device according to the invention may be used with advantage in hot-gas reciprocating machines. In the present case the term "hot-gas reciprocating engine" is to be understood to mean a hot-gas reciprocating engine, and a refrigerating machine operating according to the reversed hot-gas engine principle. Since the power supplied by a hot-gas reciprocating engine, and the cold produced by a refrigerating machine vary with the quantity of working medium contained in the working space, it will be obvious that leakage of the medium from the working space should be avoided as much as possible. This leakage will primarily occur through the bore formed between the piston rod and the bushing constituting the piston-rod guide. Therefore, gas leakage from the high pressure chamber should be avoided in these engines. The reasons for avoiding introduction of lubricant into the high pressure chamber has been discussed hereinbefore.

The invention may be used both in the most frequent case in which a cylindrical part of one body reciprocates in a bore of the other body, and in the converse case in which the body provided with a bore reciprocates along the stationary cylindrical part of the other body. If provision is additionally made of a conical bore, either the cylinder, the bore of the body, or both of them, may be conical.

In order that the invention may be more clearly understood and readily carried into effect, it will now be described more fully, with reference to the accompanying drawing in which several embodiments of the invention are represented.

Figure 1 is a diagrammatic vertical cross-sectional representation of one embodiment of the invention wherein a cylindrical body, shown in full, reciprocates in a cylindrical bore, provision being made of a scraping edge for reducing the thickness of the layer of lubricant still adhering to the cylinder.

Figure 2 is a diagrammatic vertical cross-sectional representation of another embodiment of the invention wherein a cylindrical body moves in a partly cylindrical bore, a conical shape being provided for the bore between the supply area of the lubricant and a device for reducing the lubricant film.

And Figure 3 is a diagrammatic vertical cross-sectional representation of another embodiment of the invention wherein a conical bore is provided adjacent the area of lower pressure, as well as such a bore adjacent the area of higher pressure and pumping means are provided to supply lubricant.

In Figure 1, a rod 1 reciprocates in a guide 2. The rod constitutes the body comprising the cylindrical part, while the rod guide constitutes the other body provided with a bore. At the end A there is a space containing a gas at a high pressure, whereas the space at the end B contains a gas at a lower pressure. Unless special precautions be taken, the gas at the higher pressure will escape through the bore to the area of lower pressure. The cylindrical slot formed by the surfaces of the rod and the bore facing each other is divided by the annular channel 3 into two portions 4 and 5. Through a channel 6, lubricant is supplied to the annular channel 3 under a pressure which is at least equal to the pressure which would prevail in the absence of lubricant when the gaseous medium would escape from A to B. The lubricant supplied will flow away in part to the space B and in part be carried along by the reciprocating rod 1 in the direction towards the gas of higher pressure. By the scraping edge 7 a quantity of lubricant is removed from this rod 1. The cylindrical rod 1 carrying the remaining thin layer of lubricant moves further upwards into the space A. During the return movement in the direction towards the space B, the lubricant still adhering to the rod 1 will at least partly be removed by the scraping edge 8, and this lubricant is returned to the cylindrical bore by way of the channel system 9. In order to avoid lubricant from penetrating into the space A, it is of importance that the bore of the hole 10 should be such that no lubricant is scraped off in said space. Thus a state of equilibrium may be established between the quantity of lubricant carried along by the rod 1 and that flowing back through the channel system 9.

By a suitable choice of the pressure of the lubricant supplied through the duct 6, the cylindrical bore 5 may constantly contain a quantity of lubricant by which leakage of gas is avoided.

The device shown in Figure 2 operates in a manner similar to that of the device shown in Figure 1 and described above. In both figures, corresponding parts bear the same reference numerals. In the device shown in Figure 2, the gas at A having the higher pressure is subjected to a pressure varying between definite limits. Between the cylindrical slot 4 and the scraping devices 7, 8, a conical bore 21 is provided which is directed so that the largest section thereof is towards the area of higher gas pressure. This bore is proportioned so that the lubricant therein is pumped therefrom into the cylindrical bore 4 during the movement of the rod 1 towards the space B.

The device in Figure 2 comprises a lubricant container 22. The space above the lubricant surface in the container communicates through a capillary 23 with the space A which contains the gas at a higher pressure. In the space above the lubricant surface a pressure arises which is equal to the average pressure of the gas in space A. This pressure urges the lubricant through the conduit 6 into the annular space 3. A large portion of the lubricant flows away through the cylindrical bore 5. Another portion of this lubricant, however, flows into the cylindrical bore 4 and is carried along by the reciprocating movement of the rod 1. The lubricant which is removed from the rod 1 by the scraping edges 7 and 8 enters the conical bore 21 and is pumped into the cylindrical bore 4 when the rod moves towards the space having the lower pressure. Thus the cylindrical bore 4 constantly contains a certain quantity of lubricant which acts as a liquid lock and thus prevents gas from escaping from space A to space B.

Figure 3 shows a device according to a further embodiment of the invention, which operates in a manner similar to that of the aforesaid devices. In this figure, corresponding parts of the preceding figures bear the same reference numerals. In this embodiment, a reciprocating rod 11 has a conical portion 12 the progressively increasing narrow parts thereof extending toward the high pressure gas chamber. At the end of the bore adjacent the area of lower pressure, provision is made of a conical bore 31, the largest section of which is directed towards the aforesaid area of lower pressure. The lubricant supplied to this conical bore is transported in the direction of the area of higher pressure by the reciprocating movement of the rod 11. However, when this lubricant enters the conical slot 16 formed between the conical surface of portion 12 of rod 11 and the surface of bore 5, it flows back again owing to the reciprocating movement of the rod 11 and under the action of the high pressure in area A. The result is that the cylindrical bore 5 constantly contains a quantity of lubricant which operates as a liquid lock and prevent leakage of gas.

The lubricant may be supplied to the conical slot bore in several different ways. If the space containing the gas at a lower pressure is the crank case of an engine, the lubricant may be supplied to the rod 11 by splashing, so that this lubricant eventually finds its way to the conical bore 31 upon reciprocation of said rod 11.

However, in order to ensure a practically regular supply, this embodiment comprises, at the area of the largest section of the conical bore 31, a container 34 in which the lubricant 33 supplied is collected, so that the rod 11 is constantly lubricated sufficiently. The supply of lubricant is then effected by means of an auxiliary pump 32 which pumps the lubricant into the container 34, so that the latter constantly contains an adequate quantity of lubricant 33. The excess lubricant is again conveyed to the pump through a return conduit 35.

What I claim is:

1. A device comprising two bodies in reciprocatory relationship with each other, one of said bodies comprising a cylindrical part, the other of said bodies having a bore therein, said cylindrical part fitting in said bore, means forming a high pressure gas chamber at one end of said bore, means forming a low pressure gas chamber at the other end of said bore, scraper means mounted on one of said bodies and in scraping relationship with the other of said bodies within the extent of said bore, said bore having an enlargement at the end thereof which is adjacent said high pressure gas chamber, said enlargement being in direct communication with said high pressure gas chamber and having the inner circumference thereof defined at least in part by a surface portion of said cylindrical part, and channel means within one of said bodies communicating at one end thereof with said enlargement of said bore, extending around said scraper means, and communicating at the other end thereof with said bore beyond said scraper means in the direction towards said lower pressure gas chamber.

2. A device comprising two bodies in reciprocatory relationship with each other, one of said bodies comprising a cylindrical part, the other of said bodies having a bore therein, said cylindrical part fitting in said bore, means forming a high pressure gas chamber at one end of said bore, means forming a low pressure gas chamber at the other end of said bore, scraper means mounted on one of said bodies and in scraping relationship with the other of said bodies within the extent of said bore, said bore having an enlargement at the end thereof which is adjacent said high pressure gas chamber, said enlargement being in direct communication with said high pressure gas chamber and having the inner circumference thereof defined at least in part by a surface portion of said cylindrical part, channel means within one of said bodies communicating at one end thereof with said enlargement of said bore, extending around said scraper means, and communicating at the other end thereof with said bore beyond said scraper means in the direction towards said lower pressure gas chamber, and means for introducing lubricant to said bore at a location therealong between said communication of said channel means with said bore and said lower pressure gas chamber.

3. A device comprising two bodies in reciprocatory relationship with each other, one of said bodies comprising a cylindrical part, the other of said bodies having a bore therein, said cylindrical part fitting in said bore, means forming a high pressure gas chamber at one end of said bore, means forming a low pressure gas chamber at the other end of said bore, scraper means mounted on one of said bodies and in scraping relationship with the other of said bodies within the extent of said bore, said bore having an enlargement at the end thereof which is adjacent said high pressure gas chamber, said enlargement being in direct communication with said high pressure gas chamber and having the inner circumference thereof defined at least in part by a surface portion of said cylindrical part, channel means within one of said bodies communicating at one end thereof with said enlargement of said bore, extending around said scraper means, and communicating at the other end thereof with said bore beyond said scraper means in the direction towards said lower pressure gas chamber, and means for introducing lubricant to said bore at a location therealong between said communication of said channel means with said bore and said lower pressure gas chamber, said bore having a conical configuration in a region between said scraper means and said location of lubricant introduction and widening in the direction towards said high pressure gas chamber.

4. A device comprising two bodies in reciprocatory relationship with each other, one of said bodies comprising a cylindrical part, the other of said bodies having a bore therein, said cylindrical part fitting in said bore, means forming a high pressure gas chamber at one end of said bore, means forming a low pressure gas chamber at the other end of said bore, scraper means mounted on one of said bodies and in scraping relationship with the other of said bodies within the extent of said bore, said bore having an enlargement at the end thereof which is adjacent said high pressure gas chamber, said enlargement being in direct communication with said high pressure gas chamber and having the inner circumference thereof defined at least in part by a surface portion of said cylindrical part, channel means within one of said bodies communicating at one end thereof with said enlargement of said bore, extending around said scraper means, and communicating at the other end thereof with said bore beyond said scraper means in the direction towards said lower pressure gas chamber, and means for introducing lubricant to said bore at a location therealong between said communication of said channel means with said bore and said lower pressure gas chamber, said means for introducing lubricant comprising an annular channel having communication with said bore.

5. A device comprising two bodies in reciprocatory relationship with each other, one of said bodies comprising a cylindrical part, the other of said bodies having a bore therein, said cylindrical part fitting in said bore, means forming a high pressure gas chamber at one end of said bore, means forming a low pressure gas chamber at the other end of said bore, scraper means mounted on one of said bodies and in scraping relationship with the other of said bodies within the extent of said bore, said bore having an enlargement at the end thereof which is adjacent said high pressure gas chamber, said enlargement being in direct communication with said high pressure gas chamber and having the inner circumference thereof defined at least in part by a surface portion of said cylindrical part, channel means within one of said bodies communicating at one end thereof with said enlargement of said bore, extending around said scraper means, and communicating at the other end thereof with said bore beyond said scraper means in the direction towards said lower pressure gas chamber, and means for introducing lubricant to said bore at a location therealong between said communication of said channel means with said bore and said lower pressure gas chamber, and at a pressure exceeding that which would occur at said location in the event of leakage of gas from said high pressure gas chamber towards said lower pressure gas chamber.

6. A device comprising two bodies in reciprocatory relationship with each other, one of said bodies comprising a cylindrical part, the other of said bodies having a bore therein, said cylindrical part fitting in said bore, means forming a high pressure gas chamber at one end of said bore, means forming a low pressure gas chamber at the other end of said bore, scraper means mounted on one of said bodies and in scraping relationship with the other of said bodies within the extent of said bore, said bore having an enlargement at the end thereof which is adjacent said high pressure gas chamber, said enlargement being in direct communication with said high pressure gas chamber and having the inner circumference thereof defined at least in part by a surface portion of said cylindrical part, channel means within one of said bodies communicating at one end thereof with said enlargement of said bore, extending around said scraper means, and communicating at the other end thereof with said bore beyond said scraper means in the direction towards said lower pressure gas chamber, the region of the bore adjacent said lower pressure gas chamber having a conical configuration with the widening thereof in the direction towards said lower pressure gas chamber.

7. A device comprising two bodies in reciprocatory relationship with each other, one of said bodies comprising a cylindrical part, the other of said bodies having a bore therein said cylindrical part fitting in said bore, means forming a high pressure gas chamber at one end of said bore, means forming a low pressure gas chamber at the other end of said bore, scraper means mounted on one of said bodies and in scraping relationship with the other of said bodies within the extent of said bore, said bore having an enlargement at the end thereof which is adjacent said high pressure gas chamber, said enlargement being in direct communication with said high pressure gas chamber and having the inner circumference thereof defined at least in part by a surface portion of said cylindrical part, channel means within one of said bodies communicating at one end thereof with said enlargement of said bore, extending around said scraper means, and communicating at the other end thereof with said bore, beyond said scraper means in the direction towards said lower pressure gas chamber, the region of the bore adjacent said lower pressure gas chamber having a conical configuration with the widening thereof in the direction towards said lower pressure gas chamber, and lubricant containing means provided at the widening of said bore and positioned about said cylindrical part.

8. A device comprising two bodies in reciprocatory relationship with each other, one of said bodies comprising a cylindrical part, the other of said bodies having a bore therein, said cylindrical part fitting in said bore, means forming a high pressure gas chamber at one end of said bore, means forming a low pressure gas chamber at the other end of said bore, scraper means mounted on one of said bodies and in scraping relationship with the other of said bodies within the extent of said bore, said bore having an enlargement at the end thereof which is adjacent said high pressure gas chamber, said enlargement being in direct communication with said high pressure gas chamber and having the inner circumference thereof defined at least in part by a surface portion of said cylindrical part, channel means within one of said bodies communicating at one end thereof with said enlargement of said bore, extending around said scraper means and communicating at the other end thereof with said bore beyond said scraper means in the direction towards said lower pressure gas chamber, a first region of said bore adjacent said lower pressure gas chamber having a conical configuration with the widening thereof in the direction towards said lower pressure gas chamber, a second region of said bore joining said first region of said bore at one end thereof and at the other end thereof being adjacent said scraper means, said second region having a conical configuration with the widening thereof in the direction toward said scraper means, and said cylindrical part having a portion thereof which is located between said scraper means and said one end of said second region of said bore and being of a conical configuration having the progressively increasing narrower portions thereof extending in a direction towards said high pressure gas chamber.

References Cited in the file of this patent

UNITED STATES PATENTS

| Number | Name | Date |
|---|---|---|
| 2,109,985 | Archer | Mar. 1, 1938 |
| 2,369,883 | Coopey | Feb. 20, 1945 |
| 2,467,510 | Van Den Burg | Apr. 19, 1949 |